United States Patent
Griff et al.

(10) Patent No.: US 8,160,571 B2
(45) Date of Patent: Apr. 17, 2012

(54) MOBILE DEVICE AND METHOD FOR COLLECTING LOCATION BASED USER QUALITY DATA

(75) Inventors: Paul Griff, Bellevue, WA (US); Ron Dicklin, Kirkland, WA (US); Jason Browne, San Mateo, CA (US)

(73) Assignee: Root Wireless, Inc., Bellevue, WA (US)

( * ) Notice: Subject to any disclaimer, the term of this patent is extended or adjusted under 35 U.S.C. 154(b) by 371 days.

(21) Appl. No.: 12/574,593

(22) Filed: Oct. 6, 2009

(65) Prior Publication Data

US 2010/0087188 A1  Apr. 8, 2010

Related U.S. Application Data

(60) Provisional application No. 61/103,174, filed on Oct. 6, 2008.

(51) Int. Cl.
 *H04W 24/00* (2009.01)
(52) U.S. Cl. ........ 455/423; 455/424; 455/425; 455/446; 702/186
(58) Field of Classification Search .................. 455/423, 455/424, 425, 446; 702/186
 See application file for complete search history.

(56) References Cited

U.S. PATENT DOCUMENTS

| | | | |
|---|---|---|---|
| 6,516,189 B1 | 2/2003 | Frangione et al. | |
| 6,560,442 B1 | 5/2003 | Yost et al. | 455/67.1 |
| 6,745,011 B1 | 6/2004 | Hendrickson et al. | |
| 6,754,470 B2 | 6/2004 | Hendrickson et al. | |
| 6,757,543 B2 | 6/2004 | Moran et al. | 455/456.1 |
| 6,788,926 B1 | 9/2004 | Frangione et al. | |
| 6,807,515 B2 | 10/2004 | Vogel et al. | |
| 6,928,280 B1 | 8/2005 | Xanthos et al. | |
| 7,013,136 B2 | 3/2006 | Frangione et al. | |
| 7,295,119 B2 | 11/2007 | Rappaport et al. | 340/572.4 |
| 7,299,277 B1 | 11/2007 | Moran et al. | 709/224 |
| 2002/0069037 A1* | 6/2002 | Hendrickson et al. | 702/186 |
| 2005/0182847 A1 | 8/2005 | Jawad Pirzada et al. | 709/233 |
| 2006/0007870 A1 | 1/2006 | Roskowski et al. | 370/252 |
| 2009/0138427 A1 | 5/2009 | Kalavade | 707/1 |
| 2009/0233611 A1* | 9/2009 | Olsson et al. | 455/446 |
| 2009/0310501 A1 | 12/2009 | Catovic et al. | 370/252 |
| 2010/0091677 A1 | 4/2010 | Griff et al. | 370/252 |
| 2010/0094930 A1 | 4/2010 | Griff et al. | 709/203 |
| 2010/0248640 A1 | 9/2010 | MacNaughtan et al. | 455/67.11 |
| 2011/0044193 A1 | 2/2011 | Forenza et al. | 370/252 |
| 2011/0106942 A1 | 5/2011 | Roskowski et al. | 709/224 |

* cited by examiner

*Primary Examiner* — Kamran Afshar
*Assistant Examiner* — Kathy Wang-Hurst
(74) *Attorney, Agent, or Firm* — Seed IP Law Group PLLC (57) ABSTRACT

A mobile device executes software. The software collects realistic and accurate user quality information without degrading the user experience of the mobile device during the data collection process. The software operates as a background application, and may have a user interface, and the software is remotely controllable and updatable by an external server.

15 Claims, 6 Drawing Sheets

MOBILE DEVICE AND METHOD FOR COLLECTING LOCATION BASED USER QUALITY DATA

CROSS-REFERENCE TO RELATED APPLICATION

This application claims the benefit under 35 U.S.C. §119 (e) of U.S. Provisional Patent Application No. 61/103,174 filed Oct. 6, 2008, where this provisional application is incorporated herein by reference in its entirety.

BACKGROUND

1. Technical Field

Embodiments of a mobile device disclosed herein relate to electronic devices useful for collecting data related to the performance quality of a communication network.

2. Description of the Related Art

Wireless network providers conventionally use relatively complex, expensive, private and inflexible methods for collecting information about the quality of their wireless network. More particularly, network providers use large vehicles outfitted with special equipment connected to groups of mobile phones and specialized network monitoring analyzers The data collected by network providers generally does not reflect a true user experience. Frequently, the data collected is theoretical data. In other cases, instead of true user data, the collected data is merely a representation of the results of particular tests executed by the test operator. In addition, the test equipment used is specialized for performing the tests specified by the network provider, and the collected data is often very complex. The resulting complex test information is often not available to the end user or to the general public.

BRIEF SUMMARY

A mobile device that executes performance measurement software is disclosed. The device collects realistic and accurate user quality information without degrading the user experience of the mobile device during the data collection process. In some embodiments, the software operates as a background application, and the software is remotely controllable and updatable by an external server. In some embodiments, the software operates with a user interface that provides control and feedback to the user of the mobile device. According to one embodiment a method for collecting performance quality data is taught. The method includes the step of operating a mobile device in cooperation with a particular wireless network, the mobile device operable to access contracted wireless network services via the particular wireless network. The method further includes the steps of loading a software program onto the mobile device, receiving a set of configuration data, and collecting a plurality of performance characteristics of the mobile device according to the configuration data. In the method, the performance characteristics are representative of wireless network quality. Finally, the method includes the step of wirelessly communicating at least some of the plurality of performance characteristics from the mobile device. According to another embodiment, a computer readable medium has content that configures a mobile device to perform the steps.

According to one embodiment, a mobile computing device has a central processing unit (CPU), a wireless transceiver, and a memory for storing software, which is executable by the CPU. The software is operable to wirelessly receive command information from a first server via the wireless transceiver, collect performance measurement data as directed by the command information, and communicate at least some of the performance measurement data back to a second server via the wireless transceiver. The performance measurement data is representative of the mobile computing device performance within a wireless network.

According to one embodiment, a system for collecting wireless network performance data is taught. The system has a mobile device, and the mobile device is provisioned for typical operation on a wireless communication network by a contracted subscriber. The system also has a memory associated with the mobile device, and the memory is configured to store a software application. The software application is configured to receive direction from a first server, collect the wireless network performance data according to the direction, and communicate at least some of the wireless network performance data back to a second server.

According to one embodiment, the mobile device has a central processing unit (CPU), a wireless transceiver, and a display. A memory has software stored therein, which is executable by the CPU. The software is operable to take direction in response to commands from a server wirelessly communicated to the mobile computing device through the wireless transceiver.

The device is operable to store a wireless network signal strength measurement according to a first wireless command, a wireless network data transfer speed measurement according to a second wireless command, and a wireless network data transfer latency measurement according to a third wireless command.

The device is further operable to store a video quality measurement indicative of video presented on the display communicated as video data through the wireless transceiver according to a fourth wireless command, a dropped calls measurement according to a fifth wireless command, and a network error measurement according to a sixth wireless command.

In alternative embodiments, the device is further operable to store a network architecture transition measurement according to a seventh wireless command, an audio quality measurement according to an eighth wireless command, and a battery life measurement according to a ninth wireless command.

A lost audio packet measurement is provided according to a tenth wireless command and a text message latency measurement according to an eleventh wireless command.

BRIEF DESCRIPTION OF THE SEVERAL VIEWS OF THE DRAWINGS

The components in the drawings are not necessarily to scale relative to each other. Like reference numerals designate corresponding parts throughout the several views.

DETAILED DESCRIPTION

People use mobile communication devices for business, pleasure, safety, and many other reasons. Many conventional mobile devices are used both for voice communications as well as for data communications. For example, people use their mobile devices to talk to other people, to interact with Internet web pages on mobile devices, to send and receive text messages, to receive geographical positioning information, and many other things. Accordingly, the quality of the wireless network connection and usability of the mobile device are very important to people.

The people that use mobile communication devices refer to the underlying telecommunications network with a wide variety of names. For example, the wireless communication network referenced herein may alternatively be known as a wireless network, a cellular network, a mobile network, and any combination of same or similar words. The term network as used herein is intended to broadly encompass any wireless communications network.

The operators of the wireless communications network permit some mobile devices to access and communicate over the wireless communications network. Generally, users of mobile devices pay the operators for using the wireless communications network. The operators are referenced herein as network providers, service providers, owners, carriers, and any combination of same or similar words.

The users of mobile devices that communicate via the wireless communications network include individuals and other computing devices. The mobile devices and users of the mobile devices are interchangeably referenced herein as users, mobile devices, clients, cell phones, and any combination of same or similar words.

One quality of the wireless connection is the network signal strength in a particular geographical area. This quality is a factor that directly affects the perceived usefulness, efficiency, and overall wireless network experience provided by the mobile device. In some cases, people inconveniently alter their schedules and their locations particularly to improve their wireless network experience. Accordingly, some mobile devices have some type of 'signal strength' indicator, and wireless network providers use this to try to differentiate their quality of service from that of their competitors.

Other factors that affect a user's perception of quality include battery life, audio quality, propensity of the device to not drop calls, ability to make and receive calls in remote and/or densely urban areas, accessibility to data services, technology level of data services, and the like. In many cases, the user determines the likelihood of being satisfied in these factors based on the signal strength indicator regardless of whether or not the indicator has any relation to the factors.

Wireless network providers collect data for many reasons. One reason is to generate tangible results to support their 'quality of service' marketing efforts. The data collected by the network providers is typically complex and not readily available to consumers. In some cases, the data collected by the network providers is merely theoretical, and in other cases, the data is gathered with specialized test equipment.

Wireless network operators usually display their theoretical and/or gathered quality information in simplified form on graphical maps. The graphical maps are often only found on the particular network carrier's website. The graphical maps are marketing tools for the network carrier. The graphical maps are often simplified to provide to users an understanding or estimate of how the operator's network may perform at a particular location. In some cases the limited information is merely signal strength and/or a listing of the type of data connections that are made available. In other cases, there is even less information.

Figure 1:
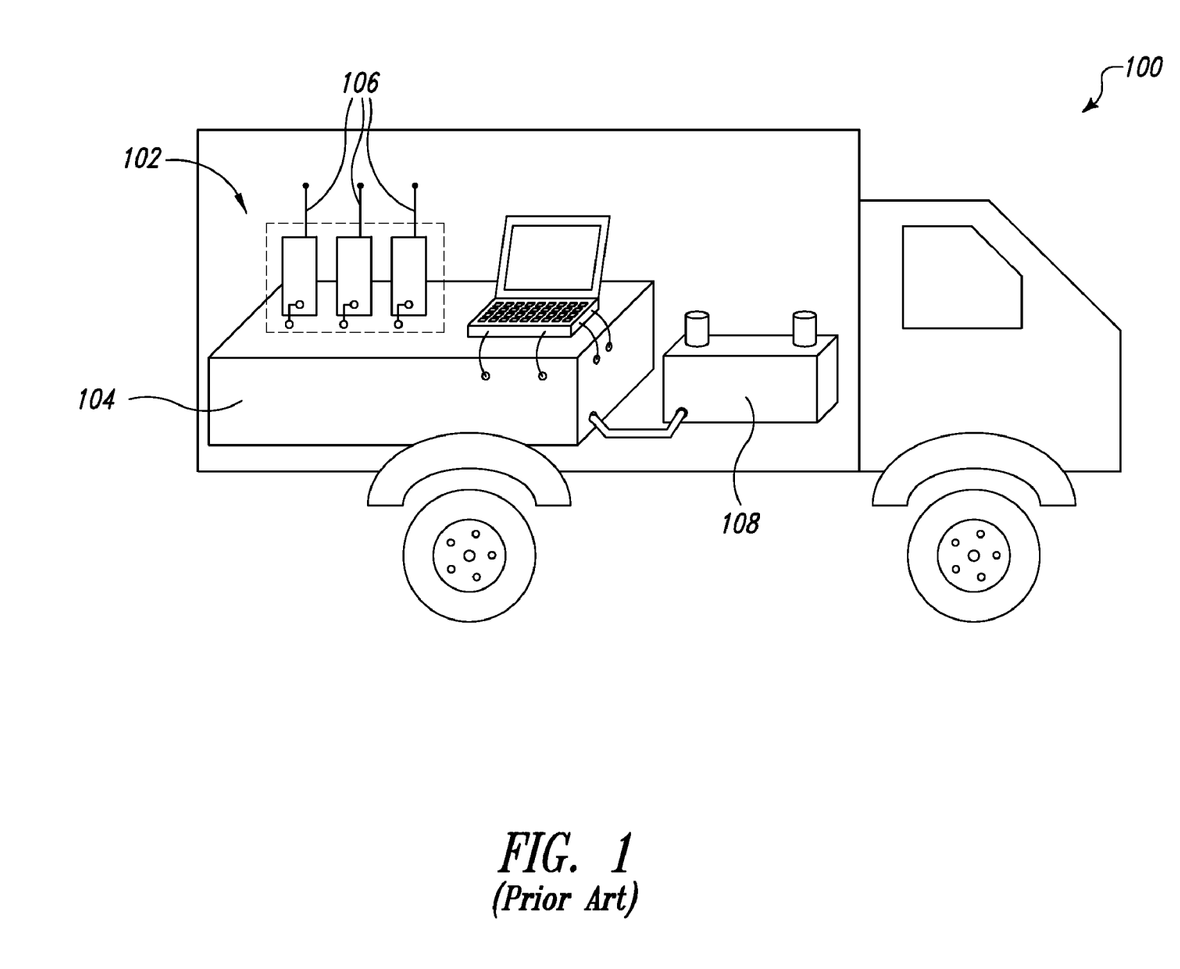
FIG. 1 illustrates a data gathering system conventionally used in the prior art to collect communication network performance data.

FIG. 1 illustrates a data gathering system 100 conventionally used to collect communication network performance data. The system 100 generally comprises a large vehicle, such as a van or truck, carrying a collection of test equipment. Several wireless devices 102 are coupled to electronic data collection devices 104. Respective antennas 106 are tuned in various configurations and also coupled to wireless devices 102 or the electronic data collection devices 104. The antennas 106 are operable to transmit and/or receive communication signals from one or more wireless communication networks. A power source 108 is used as a power supply for all of the test equipment.

In some cases, the wireless devices 102 are generally available, retail cellular phones, and at least some of the retail cellular phones may be configured with specific a software program added for the test operator. In such cases, the software program is custom designed and operable to execute a particular test desired by the test operator. For example, the program may put the cellular phone in a predetermined state, which facilitates testing. Even in these cases, however, the mobile devices have nevertheless been customized specifically for the industrialized testing environment of data gathering system 100.

In other cases, the wireless devices 102 are customized wireless equipment specifically used to facilitate testing. These wireless devices may have electronic hardware and software used to transmit known signal patterns, receive particular frequencies, and collect specific wireless communication network data.

The power source 108 in the data gathering system 100 is supplied by the on-board vehicle power system and is used to supply power for all of the system 100 test equipment. The vehicle's DC power is tapped and isolated to be a test equipment power source for power source 108. The test equipment power source provides one or more power supplies for individual pieces of test equipment. The supplies are stepped up or down as necessary and regulated for each of the test equipment devices. In some cases, one of the individual supplies is further modified from a DC power source to provide AC power for conventional 110 VAC test equipment.

The purpose of the conventional power source 108 is to provide an unlimited supply of power to satisfy the demands of the test equipment. The conventional data gathering system 100 is not concerned with power saving or power consumption and so in the conventional data gathering system 100, power measurement factors are not considered. Since power supply is not one of the variables to be tested, efforts are made to make it as constant as possible. It is designed in the data gathering system 100 for power source 108 to be an unseen, unnoticed part of the test equipment.

Figure 2:
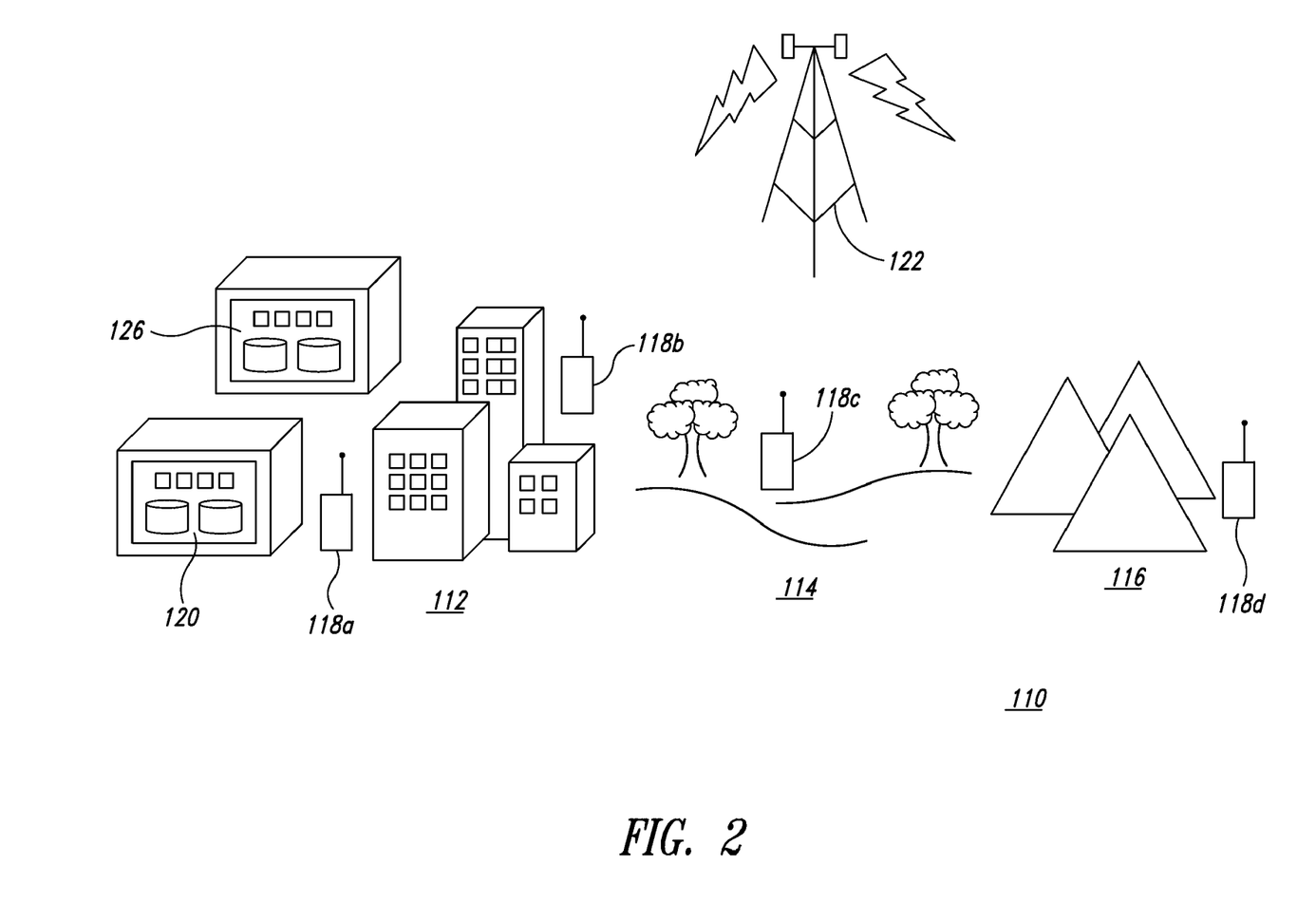
FIG. 2 illustrates a new wireless network performance measurement system.

FIG. 2 illustrates a new wireless network performance measurement system 110. Metropolitan areas 112, rural areas 114, and mountainous areas 116, are among the many areas where consumers use wireless communication devices. A cellular communication network 122 provides cellular service to each of these areas, albeit with widely differing quality. That is, to some degree, every area served by cellular network 122 is subject to low signal strength, sporadic network outages, poor communication quality, dropped calls, and a host of other problems broadly identified as "low user quality."

Cellular communication network 122 may be any available network suitable for transmitting and receiving data between mobile and/or fixed point devices, or the cellular network 122 may be dedicated to a primary purpose of delivering the information to known subscribers. Cellular communication network 122 may include both wired and wireless infrastructure; for example, transceivers, repeaters, switches, antennas, routers, public switched telephone networks, codecs, multiplexers, de-multiplexers, and the like.

Often, but not always, the hardware used to implement a particular network 122 is dedicated to a particular type of wireless network technology. For example, some technologies include Global System for Mobile Communications (GSM), General Packet Radio Service (GPRS), Enhanced Data Rates for GSM Evolution (EDGE), Code Division Multiple Access (CDMA), Universal Mobile Telecommunication System (UMTS) High Speed Downlink Packet Access (HSDPA), Evolution-Data Optimized (EV-DO), integrated Digital Enhanced Network (iDEN), Worldwide Interoperability for Microwave Access (WiMax), various 802.11 standards (WiFi), femtocells, satellite-based communications, and many others now or later developed. These technologies may share components or they may have infrastructure dedicated to their type of technology. The combination of each of the elements of the wireless network contributes to the quality or lack of quality of the wireless network 122.

Dispersed throughout the metropolitan, rural, and mountainous areas 112-116, a plurality of individual mobile devices 118a-d are operated in a manner typified by an average cellular service customer having access to contracted wireless network services. In some cases, the cellular service customer is an individual user, and in other cases, the customer is a business entity that provides the mobile device to a representative. In either case, the mobile devices 118a-d are provisioned for typical operation on a wireless communication network.

Each of the identified mobile devices 118a-d of FIG. 2 is outfitted with a software program used to collect selected cellular network, geographical, and device test data. Data collection by the mobile devices 118a-d is directed by a server 120 in a central office.

The central office may have one or more servers 120. In some cases, several servers 120 are used to provide redundant operations, which improve the robustness of the data gathering operation. In some cases, several servers 120 are used to communicate with a large number of mobile devices 118a-d. Additionally, the one or more central offices may be located in dense, urban locations or in remote, rural locations.

Server 120 sends wireless communication instructions to the mobile devices 118a-d directing each device to collect and transmit test data back to the central office server 120. Embodiments of server 120 are disclosed in a corresponding U.S. Provisional Patent Application bearing No. 61/103,160, filed Oct. 6, 2008 and a corresponding U.S. Utility patent application, filed Oct. 6, 2009, each entitled "SERVER DEVICE AND METHOD FOR DIRECTING MOBILE DEVICES TO COLLECT AND COMMUNICATE LOCATION BASED USER QUALITY DATA," and each naming each of the inventors of the present application, filed concurrently and incorporated by reference in their entirety.

Server 120 processes data received from mobile devices 118a-d and communicates the processed data to a web server 126. The web server hosts a web page that presents the processed data to viewers that access the web page. In some cases, web server 126 provides a dashboard application that permits interactive control in any type of network environment. Embodiments of web server 126 are disclosed in a U.S. Provisional Patent Application bearing No. 61/103,141, filed Oct. 6, 2008 and a corresponding U.S. Utility patent application, filed Oct. 6, 2009, each entitled "WEB SERVER AND METHOD FOR HOSTING A WEB PAGE FOR PRESENTING LOCATION BASED USER QUALITY DATA RELATED TO A COMMUNICATION NETWORK," and each naming each of the inventors of the present application, filed concurrently and incorporated by reference in their entirety.

Figure 3:
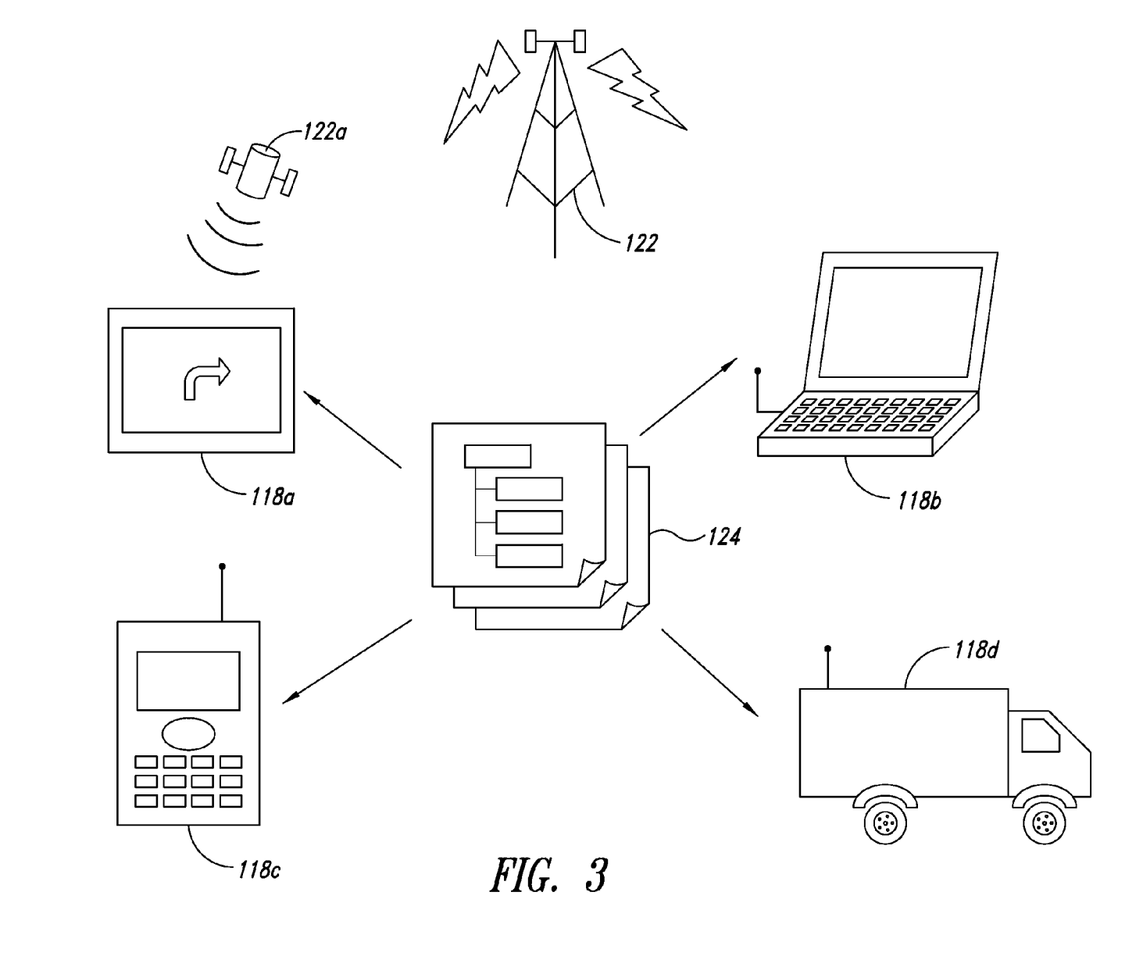
FIG. 3 illustrates examples of the mobile devices of FIG. 2.

FIG. 3 illustrates examples of the mobile devices 118a-d of FIG. 2. A handheld global positioning device 118a receives positioning information from a satellite network 122a and mapping information from a cellular network 122. A laptop computer 118b is outfitted with an external wireless card for sending and receiving voice and/or data over a cellular network 122. A mobile telephone 118c is most often used for voice and data communications on a cellular network 122. An automobile 118d commonly has cellular network 122 accessing capability for voice and data communications. The representative illustrations of FIG. 3 are merely non-limiting examples of the type of mobile wireless network client devices useful for collecting wireless network performance measurements. Many other client devices, including personal media players (PMP's), personal digital assistants (PDA's), handheld personal computers (HPC's), and the like can also be configured as described herein to collect network data. In fact, virtually any computing device with a compatible transceiver and proper configuration can be a mobile device 118a-d.

Also illustrated in FIG. 3 are a particular collection of software instructions 124. The software instructions 124, as described herein, are useful to direct the mobile devices 118a-d in collecting communication network performance quality data.

Figure 4:
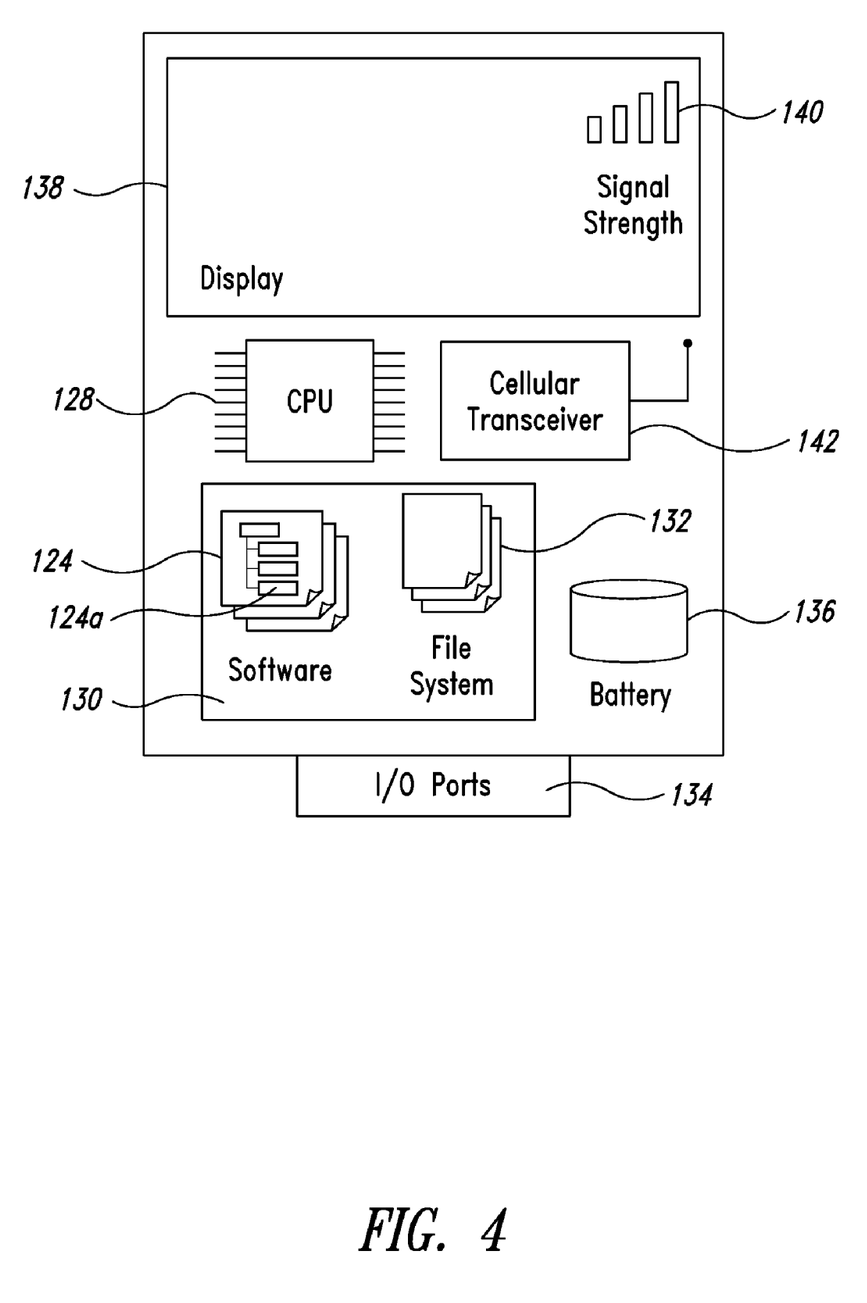
FIG. 4 illustrates several components of mobile devices from FIG. 3.

FIG. 4 illustrates several components that mobile devices 118a-d have in common. The mobile devices 118a-d are electronic communications devices having a central processing unit 128 and a volatile and/or non-volatile memory 130. The memory 130 stores instructions and data acted on by CPU 128.

Memory 130 comprises any combination of volatile and non-volatile computer-readable media for reading and writing. Volatile computer-readable media includes, for example, random access memory (RAM). Non-volatile computer-readable media includes, for example, read only memory (ROM), magnetic media such as a hard-disk, an optical disk drive, a floppy diskette, a flash memory device, a CD-ROM, and/or the like.

Inside memory 130, a particular collection of software instructions 124 are executed by CPU 128 in order to collect performance characteristics of the mobile device 118a-d, e.g., network data. The software instructions 124 operatively configure hardware and other software in the mobile device 118a-d so that particular test conditions may be set up and particular measurements may be taken. The test conditions, the resulting measurements, and other data are stored in a file system 132. File system 132 may be a traditional file system, one or more database systems, or any other method known in the art for storing such information, or any combination of the above, including implementation using distributed computing techniques.

The mobile devices 118a-d further have a collection of input/output ports 134 for passing data over short distances to and from the mobile device 118a-d. For example, serial ports, USB ports, WiFi ports, Bluetooth ports, IEEE 1394 FireWire, and the like can communicatively couple the mobile device 118a-d to other computing apparatuses.

Mobile devices have a battery 136 and a display 138. In many mobile devices 118a-d, a signal strength indicator 140 is prominently positioned on the display 140 to provide network communication connectivity information to the mobile device 118a-d operator.

A cellular transceiver 142 is used to couple the mobile device 118a-d to other communication devices through the cellular communication network 122. In some cases, software 124 and data in file system 132 are communicated between the mobile device 118a-d and a server 120 via the cellular transceiver 142. That is, bidirectional communication between a mobile device 118a-d and a server 120 is facilitated by the cellular transceiver 142. For example, a server 120 may download a new or updated version of software 124 to the mobile device 118a-d over the cellular communication network 122. As another example, the mobile device 118a-d may communicate network performance measurement data stored in file system 132 to the server 120 over the cellular communication network 122.

Each mobile device 118a-d client has electronic memory 130 accessible by at least one central processing unit 128 within the device. The memory 130 is programmed with software 124 that directs the one or more central processing units 128. Some of the software modules in the memory 130 control the operation of the device 118a-d with respect to collection of data. In some cases, software 124 directs the collection of individual datums, and in other cases, software 124 directs the collection of sets of predetermined cellular network, geographical, and device test measurements.

Software 124 may include a fully executable software program, a simple configuration data file 124a, a link to additional directions, or any combination of known software types. When the server 120 updates software 124, the update may be small or large. For example, in some cases, server 120 downloads a small configuration data file 124a to as part of software 124, and in other cases, server 120 completely replaces all of the present software 124 on the mobile device 118a-d with a fresh version. In some cases, software 124 is encrypted, encoded, and/or otherwise compressed for reasons that include security, privacy, data transfer speed, data cost, or the like.

A mobile device 118a-d executing software 124 addresses many shortcomings of the conventional methodology. Generally speaking, the conventional methodology uses an optimized antenna and transceiver system, which is not capable of collecting true, end-user experience data. In contrast, software 124 enables a specific mobile device 118a-d, provisioned for typical operation on a wireless communication network, which a user operates to access the wireless network, to collect location based true user quality data. The mobile device 118a-d is operable to access contracted wireless network services provided by the wireless cellular communication network 122.

More particularly, software 124 provides many advantageous features for the wireless network performance measurement system 110. The advantageous features are not found in the conventional methodology. For example, software 124 runs as a software application on a production-type mobile device 118a-d whereas the conventional methodology requires customized test equipment. Software 124 minimizes power consumption on the mobile device 118a-d while collecting information such as network parametric data, device location data, and user experience quality data, but the conventional methodology ignores power consumption. In addition, software 124 is directed by a centralized server 120, and software 124 sends data to a centralized server farm, but the conventional methodology has no such provision. The data sent by the mobile device 118a-d to the centralized server 120 can be used to evaluate, compare and improve the overall user experience on the wireless network that a user of device 118a-d operates for both voice and data communications.

In a preferred embodiment, software 124 collects information about the quality of the wireless communication network 122 that reflects actual user experience. The technique used in a mobile device 118a-d is to employ the actual hardware that a user operates when accessing the wireless network 122. The actual hardware includes the radio module, the audio module, the display module, and the other circuitry of the mobile device 118a-d.

One information datum collected includes network signal strength. Network signal strength is collected using the same network signal strength measurement that is presented to the user. This is useful because a user often monitors the network signal strength, e.g. through an icon. It is understood that the true network quality is not necessarily reflected correctly by the presentation to the user; however, the network signal strength presented to the user affects the user's impression of the network quality.

Network signal strength may have many components and representations. That is, network signal strength is particular to the mobile device 118a-d and the network 122 where the device is operating. For example, in some cases, network signal strength is a simple power measurement in milliwatts (mW) of the magnitude of the received signal's electric field, and in other cases, the power is measured as a ratio in decibels (dB) related to a one milliwatt reference signal (dBm). In still other cases, network signal strength refers to a signal to noise ratio, which is a relative determination between the strength of the desired radio information signal and the undesired noise interfering with it. Broadly understood, network signal strength is any measurement that characterizes the intensity and integrity of the wireless information signal received by the mobile device 118a-d.

Another information datum collected is data transmission speed. Data transmission speeds are generally collected using the highest level of application programming. This datum is useful because it takes into account even the degradation due to the mobile device hardware, software, and current operational environment. Data transmission speeds may include both voice or other data. Data transmission speed measurements may include both transmit and receive measurements, i.e., data transmitted by the mobile device 118a-d through the network 122 and data received by the mobile device 118a-d through the network 122. In some cases, the data transmission speeds are known as data download and data upload speeds.

Audio quality information is also collected. Audio quality is measured using the actual microphone and speaker of the mobile device 118a-d that the user uses to make and receive calls. In this way, information related to a user's true audio experience will be measured.

In the preferred embodiment of the new wireless network performance measurement system 110, several considerations are taken into account to minimize the impact of data collection on the user's actual experience of operating the mobile device. For example, power management, system responsiveness, audio path disruption, ease of installation, and background execution are all considered as described herein. If the functionality of any of these considerations is degraded by the data collection, then the user's experience is adversely affected significantly. The data collection software is selected to execute in a manner that will not affect the measurement of the system being measured. Several examples of this will now be given.

A first example is power consumption. Even though mobile devices 118a-d are capable of hard-wired, external power or conventional alternating current (AC) power connections, many devices are powered substantially by batteries. In some cases, the batteries are disposable, and in other cases, the batteries are rechargeable, but in either case, batteries are generally capable of operating the device for only a short time before needing to be replaced or re-charged by the device operator. That is, after just a few hours, days, weeks, or some other short time period, the operator must attend to the expended batteries. Accordingly, maximizing the battery life of a mobile device 118a-d is often a goal of device manufactures, device sellers, and device users.

The mobile device 118a-d uses power during data collection. That is, the execution of software and the operation of hardware solely for the purpose of collecting, processing, and distributing test data will expend power that would not otherwise be expended. If wireless network performance measurement system 110 minimizes its power usage, then the attention to the battery required by the device 118a-d is minimized. The additional power consumed by the testing can be considered and taken into account when measuring power consumption in one embodiment. The power consumed by the testing software 124 will not be considered a power consumed by the system in such an embodiment. In other embodiments, the battery life will be reported based on the life as it would have been without the test software 124 running at various times.

In a preferred embodiment of software 124, data is collected only in certain locations and as infrequently as possible to minimize overall power consumption of the mobile device 118a-d. By reducing the data collection locations and frequency, power usage is reduced and correspondingly, the user's perception that software 124 is detrimentally affecting the power usage of the mobile device 118a-d is reduced.

A second example is internal CPU usage. The test software 124 makes use of the CPU, so that when it is executing, the CPU usage goes higher. The software 124 monitors how much its own use is adding to the CPU usage factor and subtracts this from the measurement, according to one embodiment.

A third example is bus throughput on internal bus data transmission speed. To the extent running the tests affects the internal bus throughput, this is accounted for and removed from the test results.

A fourth example is interrupt measurements, which, since the CPU receives interrupts as part of its standard operations and also when being tested by software 124, these test based interrupts should not be counted in the system performance. More or less of these accommodations of the measurement affecting the measured quantity can be considered and taken into account by the software 124 according to various embodiments.

In order to collect data only in certain locations, one embodiment of software 124 records and updates the name and/or ID of the currently connected (i.e., associated) cell tower. In many devices, the radio module independently communicates with one or more cell towers. A cell tower that has established connection with a device supplies its name and/or ID to the device, and the name and/or ID is stored in the radio module. The data exchange that transfers the cell tower name to the mobile device 118a-d is a transaction that is executed independently on the device. The transaction is even executed when the mobile device 118a-d is in a power saving mode.

The wireless network performance measurement system 110 uses the cell tower name to break down data collection coverage areas into sectors. Server 120 maps out these sectors to determine which sectors should be updated with fresh data. Based on the sector mapping, or based on the least recently updated sector, or based on some other means, server 120 will send a particular cell tower update list to the mobile device 118a-d. The cell tower update list includes cell tower names identifying sectors where server 120 requests updated wireless network performance data. When the mobile device 118a-d detects that it is connected to a cell tower on the list, the mobile device 118a-d will collect data whenever the device moves more than some predetermined amount, for example 30 meters.

In another preferred embodiment, a unique user location profile may be generated for a mobile device 118a-d operating in a wireless network performance measurement system 110. For example, each mobile device identified by server 120 may be given a unique identifier. The unique identifier may be random number, an Electronic Serial Number (ESN), an International Mobile Equipment Identifier (IMEI), or some other number. In many cases, the number is encrypted. After generating the unique identifier, the identifier may be combined with typical geographic and time information to create the unique user location profile for each mobile device 118a-d.

After a user location profile is generated for a mobile device 118a-d, the profile is available for use by server 120 to collect particular data at particular times and in particular locations. In some cases, server 120 can use the profile in a predictive manner, and in other cases, server 120 can use the profile to make decisions about data retrieval from particular mobile devices 118a-d. The server 120 sends new software 124 (e.g., a configuration data file 124a) to the mobile devices 118a-d in order to change the testing being performed. It also sends instructions and queries to the software 124 to cause it to execute selected routines as directed by the server 120 or for the server to understand what version of the software 124 is present on each of the devices 118a-d, what tests each is conducting at any given time, and to learn other things about the respective devices 118a-d.

In order to collect data only in certain locations and as infrequently as possible, server 120 actively monitors how many mobile devices 118a-d are currently in a particular sector. Server 120 further monitors which sectors have outdated or otherwise insufficient data. Server 120 may increase or decrease the frequency of data collection of a mobile device 118a-d based on the age, quality, or volume of data previously gathered. Software 124 in a mobile device 118a-d is responsive to the requests for data of server 120.

When the wireless network performance measurement system 110 is initialized in a new geographical area, the number of data collection mobile devices 118a-d may be small. Performance and power considerations are considered for each mobile device 118a-d, so server 120 may only request data in certain areas of interest, and server 120 may function to prevent or minimize the collection of data in overlapping areas. For example, in areas where there are few mobile device clients 118a-d, the mobile device client may be requested to collect data with greater frequency only in areas where server 120 does not currently have data. Alternatively, server 120 may reduce or suspend requests for data in areas where server 120 does not currently have data. In other cases, server 120 may request data based on one set of parameters, but software 124 of mobile device 118a-d may decide locally whether and how to respond to the request based on a local set of parameters. Parameters that software 124 may use to decide whether and how to respond include current battery life, current processor utilization, scheduled events, and the like.

In some cases, the wireless network performance measurement system 110 is initialized or operating in a geographical area where the number of data collection mobile devices 118a-d is large, e.g., 5000 or more devices. In such cases, server 120 may further function to adjust the frequency and/or volume of data collection by a particular mobile device 118*a-d*. For example, rather than collecting data from every device, server 120 may collect data from only some devices and use techniques such as statistical modeling, to create a complete set of wireless network performance data. As another example, server 120 may direct some mobile devices 118*a-d* to collect data of one type and direct other mobile devices 118*a-d* to collect data of another type. The wide range of data collection directions provided by server 120 in a geographical area having many mobile devices 118*a-d* reduces the demand for power due to data collection on each mobile device 118*a-d*.

Another technique used by the server 120 to direct data collection only in certain locations and as infrequently as possible is to take advantage of location based services on the mobile device, for example, the global positioning systems (GPS) within some mobile devices 118*a-d*. The GPS is capable of providing latitude and longitude coordinates as well as other distance and positional information. Operating the GPS circuitry, however, uses a large amount of power on most devices. Accordingly, it is often desired to collect GPS data only when mobile device 118*a-d* has changed location.

One technique used to minimize the frequency of GPS driven data collection is to take advantage of the cellular network's capability to provide the distance of the mobile device 118*a-d* from the closest cellular tower or any other cellular tower. The cellular tower information is collected by the radio hardware in the mobile device 118*a-d*, so a request from software 124 to the radio hardware for this information will generally not increase power consumption. More particularly, each radio module on the mobile device 118*a-d* monitors the distance between the device and the currently connected cell tower. This distance data is independently updated by the radio module on the mobile device 118*a-d* even in a power saving mode. By monitoring the value of this distance, software 124 can detect when the mobile device 118*a-d* is in motion and when the mobile device 118*a-d* has moved from a particular position by a predetermined amount, e.g., 30 meters.

Using the distance information from the cellular tower, a set of data collection rules provided by server 120 or otherwise available to software 124 direct whether or not the GPS module needs to be engaged. For example, if the distance to the closest cellular tower has not appreciably changed, then the mobile device 118*a-d* may not be directed to capture new GPS coordinates and new network performance data.

Another data set collected by the wireless network performance measurement system 110 is the speed of data transmission across the wireless network 122 and within the mobile device 118*a-d*. The collection of data speed measurements, however, consumes power. Data speed measurements involve sending and receiving network data using the mobile device's 118*a-d* wireless radio transmission and reception circuitry.

There are several techniques used to reduce the power consumption of the data speed measurement test. For example, in one technique, mobile device 118*a-d* is only directed to collect data when the device is at a specific location. In a second technique, data speed measurements are performed infrequently on any given device, but the data speed measurements are performed on many devices so that a wide range of data is gathered. In a third technique, data speed measurements are collected by evaluating user or network directed data transmissions instead of sending and receiving dedicated test data for the data speed measurement. In a fourth technique, dedicated test data is piggybacked on a preexisting data transmission. In many cases, power consumption for data speed measurement is reduced because the radio is already being operated for another purpose, e.g., when a user is checking email, surfing the web, transferring files, or some other user requested purpose.

Data collected by the mobile device 118*a-d* is returned to server 120. Another technique useful to saving power on the mobile device 118*a-d* is to adjust the manner in which the data is returned to server 120.

Many devices, such as mobile device 118*a-d*, contain a large amount of file storage space. This storage space is useful to software 124 for storing wireless network performance data. In one embodiment, the software 124 is designed to send GPS and other test information to the server 120 only when it is plugged into a power supply. With file storage capability, software 124 can wait to send the data to the server 120 until the mobile device 118*a-d* is being charged or is otherwise operating from a power source more robust than a battery, such as an external source. Alternatively, in cases where it is not reasonable to wait until the device is being charged, software 124 can piggyback the performance data on user initiated data transfers. The piggy-backing technique minimizes the need to establish a new connection, which can reduce power consumption.

In some embodiments, software 124 operates in a Microsoft Windows Mobile environment. In a Microsoft Windows Mobile environment, the mobile device 118*a-d* is often connected to a PC using an ACTIVESYNC protocol. The ACTIVESYNC protocol is one of many similar configuration and networking protocols that use a wireless or wired network resource to transmit and receive data. In such cases, the mobile device 118*a-d* is charging, however the cellular radio functionality is temporarily disabled. In these environments, the technique of piggy-backing data on user-initiated data transmissions is useful to reduce power consumption on the mobile device 118*a-d*.

In other embodiments, software 124 functions in another commercially available operating system environment. In these cases, software 124 may be ported to specifically function in the particular operating system or software 124 may be generic enough to operating on several operating systems. In these cases, different techniques may be used to save power, transfer information, or the like.

Another useful technique is to take further advantage of circumstances where mobile device 118*a-d* is being charged or is otherwise operating from a robust power source (e.g., an external power source). In these cases, software 124 may be directed to conduct additional or more data intensive testing. For example, in some cases, mobile device 118*a-d* is plugged into a vehicle's power source. If the vehicle, e.g., an automobile, is moving, then the mobile device 118*a-d* may perform an expanded range of wireless network performance data collection.

Data may also be collected in mobile devices 118*a-d* without GPS capability and where the device stays within range of a particular cellular tower name.

The operation of software 124 is preferably un-noticed by a user of the mobile device 118*a-d*. More particularly, the software 124 should not cause the user to notice an impact on the CPU performance and file system of the mobile device 118*a-d*. One way to avoid this is to schedule software 124 to run at a very low priority. Another way is to permit user requested actions to be performed without delay. For example, in addition to operating at a low priority, software 124 can be configured to immediately suspend operation when a user requested action is detected.

Audio quality data is collected by the wireless network performance measurement system 110. Preferably, the measurement of audio data quality will not be noticed by the user of the mobile device 118a-d. One technique useful for keeping software 124 from impacting, adversely and significantly, the user experience of the mobile device 118a-d is to collect data when the audio circuitry is used, but to suspend processing of the data until the audio circuitry is no longer being used. For example, data may be collected during a phone call or during audio playback of a particular file, but any post-processing of the data occurs at a later time, and the results collected are transmitted to server 120 at a later time.

In a preferred embodiment, software 124 is easy to install and the installation procedure will have little or no user intervention. For example, the installation of software 124 may be composed of a simple over-the-air (OTA) download having a click install, no questions presented to the user, and not requiring the user to reboot the device. In this manner, the user will be aware that software 124 has been installed, but the installation procedure will have been relatively quick and easy.

Also in a preferred embodiment, software 124 will run generally in the background, transparent to the user. Preferably, the user will be aware that software 124 is performing data collection work on the mobile device 118a-d, but the actual operation of software 124 will be un-noticed. In this manner, a user may be encouraged to install software 124 and permit the mobile device 118a-d to collect data for the wireless network performance measurement system 110.

The wireless network performance measurement system 110 presents a structured device management architecture in which to operate software 124. The structured architecture permits an external device, server 120 for example, to direct the operation of mobile device 118a-d. The structured architecture further permits the data collection of mobile device 118a-d to be synchronized with other mobile devices.

For example, synchronization of data collection permits multiple mobile devices to be directed with either the same or complementary data collection techniques. In this manner, the effectiveness of each mobile device within the wireless network performance measurement system 110 may be increased. For example, in some cases, the real time location of the device is used to determine which data will be collected. In other cases, different criteria are used to direct the data collection including the type of device, the current application load, the signal strength indication, or the like.

Within the wireless network performance measurement system 110, a mobile device 118a-d can be associated with one or more particular groups on the server 120. The grouping permits a server 120 to configure multiple mobile devices 118a-d with a common set of data collection rules such as a data collection update schedule. Generally, the mobile device 118a-d is unaware of which group it is currently associated with, but in some cases, during system testing for example, the mobile device 118a-d is aware of its group assignment.

Mobile device 118a-d is operable to accept direction from server 120 when server 120 communicates with the mobile device 118a-d. In one embodiment, communication between the server 120 and the mobile device 118a-d is facilitated through one or more data sockets. That is, mobile device 118a-d opens a data socket to server 120, which permits direction from server 120 when the rules are to be changed, software is to be updated, or any other control information is to be exchanged. In cases where a single socket is opened, the communication of all control information over the single socket is helpful to reduce data network usage.

Server 120 is operable to update and modify the data collection rules for the mobile device 118a-d. For example, in some cases, server 120 configures the mobile device 118a-d with parameters including a list of data points to collect, a list of real-time locations identifying where data will be collected, and an indication of how often data points should be collected. Generally, server 120 configures the mobile device 118a-d asynchronously and at any time.

In a preferred embodiment, software 124 includes a configuration data file 124a. The configuration data file 124a is generally received from server 120 in a wireless manner, but other techniques may also be used. For example, a wired connection or a memory card may be used to provide the configuration data file 124a of software 124 of the mobile device 118a-d. Alternatively, the configuration data file 124a may not even reside on the mobile device, but instead be remotely located and merely accessible by the mobile device 118a-d.

The configuration data file 124a of software 124 may be small or large, but typically represents rules passed to the mobile device 118a-d that are to be followed by the device when collecting data. In some cases, the configuration data file 124a has executable code that carries out or otherwise directs the rules, but in other cases, the configuration data file 124a has only indicators of which pre-programmed rules that the mobile device 118a-d will follow.

Several data collection rules direct the data collection operations of the mobile device 118a-d. By operating the mobile device 118a-d under a set of changeable rules, the value of the data that is collected and passed to the server 120 is improved. For example, in some cases, the rules are directed to all mobile devices 118a-d, and in other cases, the rules are directed only to particular devices. Other preferred embodiments take advantage of the user location profile for the particular mobile device 118a-d. That is, based on the unique identifier for the mobile device 118a-d, the time, location, or other parameters of the device may be predictively and/or dynamically used to direct the data collection.

One rule passed to mobile device 118a-d is a cell tower list rule. The cell tower list rule includes a list of cell tower areas where data collection is desirable. According to this rule, software 124 monitors the identity of a currently connected cell tower, and when the mobile device 118a-d connects to a new cell tower, software 124 scans the cell tower list to determine if data collection has been directed. In some cases, the cell tower list is disabled, which is a direction to the mobile device 118a-d to collect data in all areas.

Two other rules passed to mobile device 118a-d are a data speed test frequency rule and a data latency test frequency rule. The rules include a value of how many seconds the mobile device 118a-d will wait between each data speed test or each data latency test respectively. Server 120 can direct mobile device 118a-d to run a data speed or data latency test at a single frequency, at a particular pattern of frequencies, a random frequency, or at some other interval. Further, individual cell towers or groups of cell towers in the cell tower list rule can correlate independent values for the data speed and data latency test frequency rules. In addition, when the cell tower list is disabled, independent default values may be specified for the data speed and data latency test frequency rules.

Through the data sockets, a particular command channel can be opened up from server 120 to mobile device 118a-d. The command channel may be initialized by either the server 120 or the mobile device 118a-d, and either unit may initiate a control cycle. The command channel permits the communication of control information between the server 120 and the mobile device 118a-d.

Using the command channel between the server 120 and the mobile device 118a-d, the centralized server 120 can interrogate the software 124 for its current version. For example, server 120 may send a "VERSION" command to mobile device 118*a-d*. Software 124 will return its current version number to server 120. In one embodiment, the version number will be a single floating point number.

Using the command channel between the server 120 and the mobile device 118*a-d*, the centralized server 120 can update the software 124 of the mobile device 118*a-d* to latest version. Generally, after the software 124 has been updated, the new version of software 124 will restart without the need for a reboot of the mobile device 118*a-d*.

The command channel between the server 120 and the mobile device 118*a-d* can be used for many other commands. For example, an UPDATE command is useful for sending a name string from the server 120 to the mobile device 118*a-d*. A TIME_SYNC command is useful for synchronizing the current time, date, day or the like between the server 120 and the mobile device 118*a-d*.

The use of particular rules for data collection, along with the command channel for communicating command information, permits the mobile device 118*a-d* to collect significant data related to the wireless network performance measurement system 110. For example, Table 1 lists several data sets and individual data points that are collected by a mobile device 118*a-d* in a preferred embodiment.

TABLE 1

Data collected and communicated to a server

Cellular Network Signal Strength
802.11 Network Signal Strength
Network Capability level (Ex. 2G, 3GPP, LTE, etc.)
Network Technology (Ex. WiMAX, EDGE, etc.)
Data Transfer Speed, both Upload and Download
Data Transfer Latency from the device to the server and the gateway
Video Quality at different bitrates
Dropped Call/Network errors
Transition from one cellular network technology to another technology such as a transition from 3G to Edge.
Audio Quality both directions on different cellular network technologies such as 3G, Edge, etc.
Battery Life on different mobile phones and different cellular network technologies
Lost audio network packets that is experienced as choppy or poor audio
SMS/Text latency
Tower ID
Signal to Noise Ratio (SNR)

In a preferred embodiment of a mobile device 118*a-d* that is running the inventive data collection operations described herein, a program in software 124 executes. In one embodiment, descriptively called the Service Mode, the software 124 is operating in the background, with no indication to the user of the mobile device 118*a-d* that the program is running. At other times, descriptively called the Application Mode, the background application is accessible to the user of the mobile device 118*a-d* to either provide information to the user or to operate according to instructions from the user. Embodiments of both the Service Mode background application and the Application Mode foreground application will now be described with reference to the figures.

For example, on a mobile device 118*a-d*, in software 124, a data collection client software program is initialized and begins execution in the Service Mode. The program requests particular resources from the operating system that is executing on the mobile device 118*a-d*, and the program sets up particular data structures in software 124 and file system 132, both of which are resident in memory 130 in the preferred embodiment.

In the Service Mode, the program typically has two main functions. A first function of the Service Mode operates to collect data from the mobile device 118*a-d*. A second function of the Service Mode operates to communicate the collected data to a central collection server.

In the Service Mode, the user does not have to dynamically interact with the software 124 to provoke the application to collect the required data. For example, a predefined set of rules may be present in software 124, or alternatively, a default configuration data file 124*a* is resident within software 124. The predefined rules or configuration data file direct the operations of the Service Mode. In other cases, if the default configuration is not present or is outdated, a new configuration data file 124*a* may be loaded into software 124 or file system 132. Advantageously, a configuration data file 124*a* permits quick and dynamic control of the Service Mode without substantial changes to software 124.

In one embodiment, the Service Mode operations will request a new configuration data file 124*a* from a server 120. In other embodiments, a server 120 will initiate a download of a new configuration data file 124*a* to the mobile device 118*a-d*. The communication of the configuration data file 124*a* may be manually directed or may be scheduled for automatic operation. In any case, when a new configuration data file 124*a* is downloaded wirelessly, server 120 and the mobile device 118*a-d* form an HTP, UDP, FTP, or other connection to facilitate the download.

In one embodiment, the configuration data file 124*a* is very small. In such an embodiment, the configuration file 124*a* is received as a payload of a single message packet from the server 120. Accordingly, the small configuration file 124*a* serves many purposes. For example, in environments where the data communication services are not robust, a small data payload increases the likelihood of communication success. As another example, the small configuration data file 124*a* reduces the power consumed by the mobile device 118*a-d*.

In the preferred embodiment, the collection function of the Service Mode gathers a set of Key Performance Indicators (KPI), such as those found in Table 1. The mobile device 118*a-d* is scanned, and one, some, or a full set of all KPI are periodically collected and stored in memory 130. For example, using an internal timing mechanism of the mobile device 118*a-d*, the KPI data may, by default, be collected one time every hour, one time every day, or by some other period.

In a preferred embodiment, the KPI data may be collected at the same time every hour or may be scheduled in another fashion. For example, the Service Mode may be configured to scan the mobile device 118*a-d* at the same time each hour within a 24-hour period, and then, at the beginning of the next 24-hour period, the minute within each hour when the KPI are collected is offset by a predetermined amount. In this manner, for example, if the predetermined amount of offset is one minute, then after a 60-day cycle, the mobile device 118*a-d* will have been scanned at every minute at least once throughout a 24-hour time span.

As another example, the KPI data may be collected at any time within a particular time window. That is, when the mobile device 118*a-d* is active, the current time may be retrieved, and if the current time is within a particular time window, then the mobile device 118*a-d* is scanned.

After KPI data is collected, the data is communicated in an update function of the Service Mode to server 120. The data may be requested by the server 120 or the communication of KPI data may be initiated by the mobile device 118*a-d*. For example, using an internal timing mechanism of the mobile device 118*a-d*, which may be the same or a different timing mechanism used during KPI data collection, the collected data may be communicated to the server 120.

In some cases, the Service Mode may have timers set to trigger a KPI data collection scan of the mobile device 118*a-d* at a time which overlaps another trigger set to send KPI data to a server 120. Advantageously, the KPI data collection scan is most often allowed to complete before the data is updated to server 120. In this way, the updated KPI data communicated to server 120 is the most recent data collected on the mobile device 118*a-d*.

As previously described, a configuration data file 124*a* in memory 130 directs the Service Mode to perform particular KPI data collection operations. The configuration data file 124*a* may be updated as needed to change which KPI data are collected, how often the KPI data is collected, the geographic location of where KPI data are collected, or any combination of these or other parameters.

For example, if it is determined that a particular geographic area in which a mobile device 118*a-d* operates has sufficient data that was collected during the morning, and a need for additional data during the evening, then an updated configuration data file 124*a* may direct the Service Mode to collect KPI data more frequently and only during the evening.

Other factors may also be used to update a configuration file 124*a* or to control operations of the Service Mode. For example, since mobile devices are generally sensitive to power consumption, the type of supply that is powering the mobile device 118*a-d* may also be considered. In one embodiment, a mobile device 118*a-d* that is plugged into a geographically fixed power supply, such as a cradle, will collect all KPI data available on mobile device 118*a-d* at a particular rate instead of just collecting the KPI data directed in a configuration data file 124*a* at a different rate. Similarly, if the mobile device 118*a-d* is plugged into a mobile power supply, such as a car charger, the Service Mode will operate to collect all KPI data more frequently or at a schedule impacted by geographic location. These and other modes are contemplated and easily directed by server 120 or by the programmed operation of the Service Mode.

Storage of the KPI is typically maintained until the KPI are off-loaded to server 120 or another server. In addition, or alternatively, the KPI may also be stored in a cyclical buffer arrangement wherein older data is released so that newer data may be collected.

Communication of the KPI data, the configuration data file 124*a*, or any other communications between the mobile device 118*a-d* and server 120 are optionally encrypted. By using an available encryption scheme, for example the exchange of secure keys in a symmetrical, asymmetrical, or other fashion, the information passed between the mobile device 118*a-d* and the server are kept confidential. In a preferred embodiment the validation of the information operates to prevent fraudulent and/or malicious information from infecting the mobile device 118*a-d* and/or the server 120. In addition, the validation of the information may also be used to govern the amount of KPI data received by the server 120. E.g., legitimate data from a mobile device 118*a-d* may be intentionally rejected if the server 120 determines that the data is not necessary.

In an additional example, on a mobile device 118*a-d*, in software 124, a data collection client software program also begins execution in the Application Mode. Typically, the Application Mode takes advantage of operations of the Service Mode, but in some embodiments, the Application Mode operates independently and performs the same or similar functions of the Service Mode.

In the Application Mode, the program requests particular resources from the operating system that is executing on the mobile device 118*a-d*, and the program sets up particular data structures in software 124 and file system 132, both of which may reside in memory 130. Additionally, the Application Mode presents a particular user interface on the mobile device 118*a-d*. For example, display 138 and/or I/O ports 134 are used to convey information about the KPI data collection to and from a user.

In one embodiment of the Application Mode, the user is given an opportunity to execute default KPI data collection, Service Mode scheduled KPI data collection, configuration file KPI data collection, or manually selectable KPI data collection. Similarly, the user may also be given an opportunity to direct when and/or how the KPI data will be communicated to server 120. In one example, in a preferred embodiment of the Application Mode, the user is presented with a 1× button, a 3× button, or a 10× button. Via this interface, the selection of a particular button will cause one, three, or ten consecutive KPI data collection scans on the mobile device 118*a-d*. Of course, any other number of options or directions may be provided in the Application Mode.

In some cases, the manually instigated KPI data collection scans include multiple signal strength tests, latency tests, uplink speed tests, downlink speed tests, and other network performance tests. Additionally, geographic coordinates, timestamp information, cell tower information, data type information, and other details deemed relevant to the particular network state are also captured.

In an additional embodiment, a user may add Network Reliability Alerts to the Application Mode to alter how and when KPI data is collected. For example, an alert may be set to trigger a particular set of KPI data collection operations whenever a call is dropped. In such an embodiment, additional KPI data is tagged to the geographic location where the dropped call occurred. In another embodiment, the user or the mobile device 118*a-d* may detect poor voice quality via choppy or static-laden audio, dropped packets, or some other means. In this embodiment, a particular set of KPI data collection may also be geographically tagged. In still another embodiment, the communications network 122 may be completely inaccessible for any reason. In this case, a particular set of KPI data collection may also be geographically tagged. Understandably, the Application Mode provides the user of the mobile device 118*a-d* with a nearly unlimited opportunity to collect particular KPI data.

The Application Mode may also present data to the user of the mobile device 118*a-d*. The data may be raw KPI data or may be processed KPI data. For example, timestamps for particular KPI data scans may be presented as a historical representation of the mobile device's performance. Alternatively, or in addition, the total number of data scans performed and uploaded may be presented, and the results of individual network parameters collected may be presented. Additionally, in some embodiments, the user is permitted to input parameters into the software 124 of mobile device 118*a-d* to control the timing, frequency, or other parameters of KPI data collection.

Figure 5:
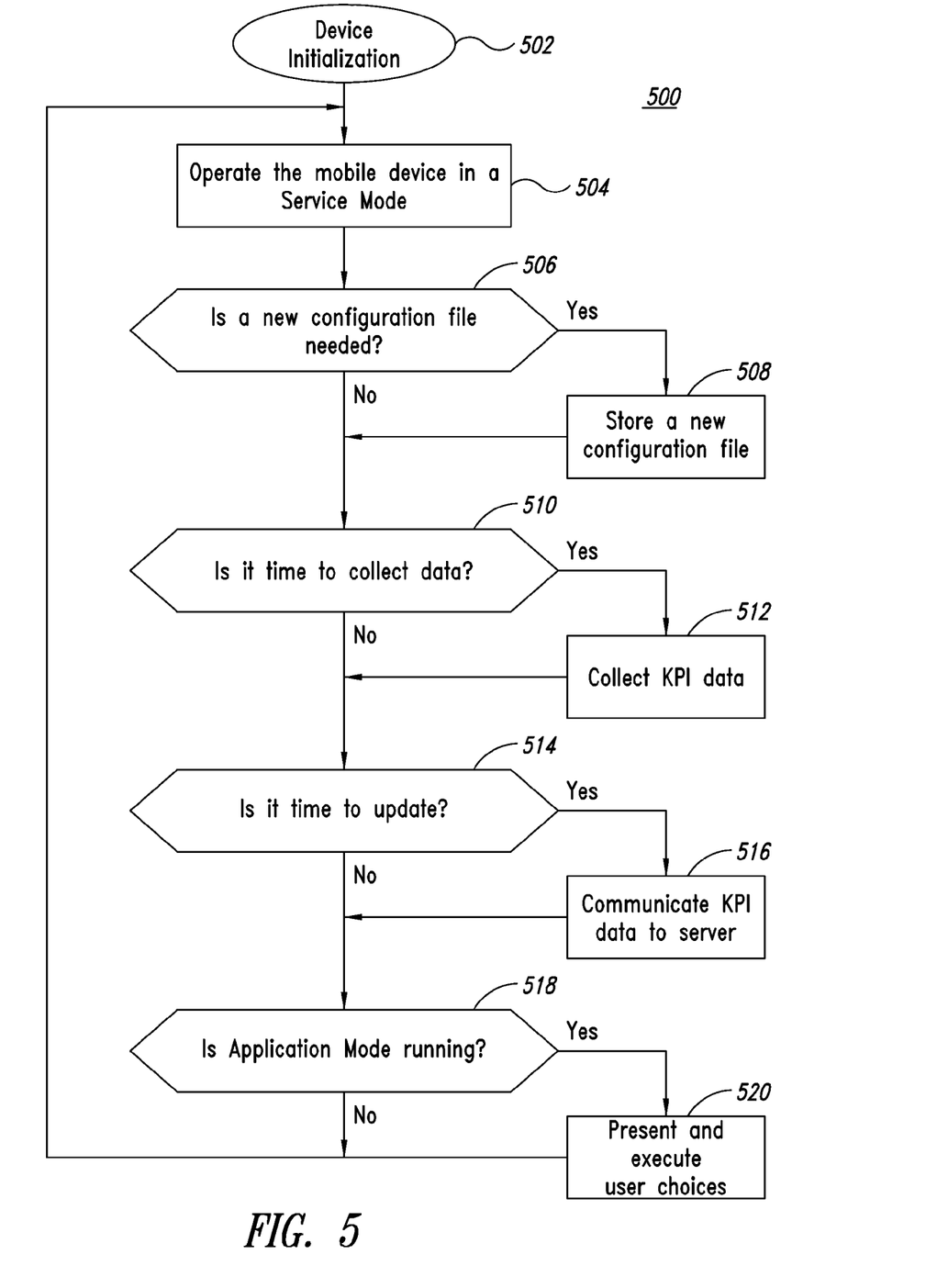
FIG. 5 is a flowchart illustrating a process used by a mobile device embodiment.

FIG. 5 is a flowchart 500 illustrating processes that may be used by embodiments of the mobile device used for collecting network performance data. In this regard, each described process may represent a module, segment, or portion of code, which comprises one or more executable instructions for implementing the specified logical function(s). It should also be noted that in some implementations, the functions noted in the process may occur in a different order, may include additional functions, may occur concurrently, and/or may be omitted.

With respect to FIG. 5, the process 500 is ongoing with operation of the mobile device 118a-d, and is illustrated as starting at 502 when the mobile device 118a-d initializes. At 504, operation of the mobile device 118a-d begins in a Service Mode. If a configuration file is to be loaded at 506, then the new configuration file is stored at 508. When the mobile device 118a-d is directed to collect data at 510, a set of one or more KPI data are collected at 512. The process determines if a server 120 is to be updated with collected KPI data at 514, and if so, the update is performed at 516. If the Application Mode is to be invoked at 518, then the Application Mode presents user choices at 520. The process 500 does not typically end, but instead, cyclically returns to the Service Mode operation at 504.

Figure 6:
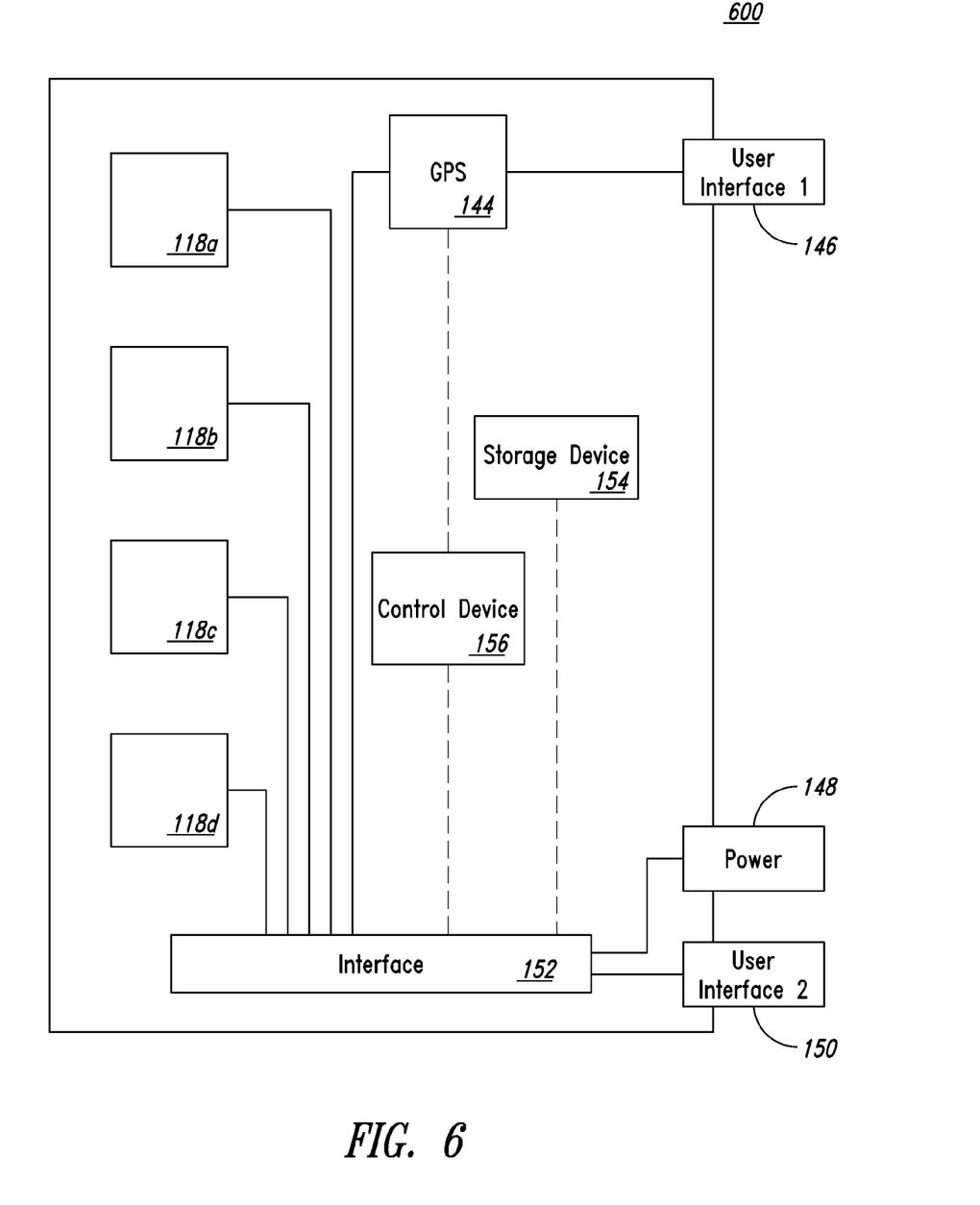
FIG. 6 is a schematic of a mobile multi-unit test data collection device.

FIG. 6 illustrates a mobile multi-unit test data collection device 600. In the device, particular mobile devices 118a-d are mounted in a chassis. The chassis may be a toolbox or some other enclosure having an interior that is either predominantly sealed or easily accessible. In some cases, the multi-unit device 600 is portable, but in other cases, the multi-unit device 600 is fixedly mounted in a vehicle.

The multi-unit device 600 also has a global positioning system (GPS) device 144 and a user interface 146 for the GPS 144. The user interface may include only the interface of the GPS 144 or there may be additional indicators or control inputs integrated into the multi-unit device 600.

Also resident in the multi-unit device 600 are an internal interface 152 having a power input 148 and another user interface 150. The internal interface 152 may be any type of hardware or combination of hardware and software used to facilitate power sharing and/or control signals. As illustrated in the embodiment of FIG. 6, each of the mobile devices 118a-d and the GPS 144 share power from the internal interface 152 as provided by the power input 148.

The multi-unit device 600 receives power via power input 148. The power may be from a battery, a vehicle power supply, or some other supply. In some cases, the power source and the power input 148 are internal to the multi-unit device 600.

In one embodiment of the multi-unit device 600, several mobile devices 118a-d are programmed with the software 124 described herein. The mobile devices 118a-d are configured to collect wireless network performance data of the type illustrated Table 1. In the embodiment, GPS 144 is programmed to provide turn-by-turn directions to an operator of the multi-unit device 600. In this way, the multi-unit device 600 can be used to collect large or small volumes of very specific wireless network performance data in particular geographical locations.

Optionally, embodiments of the multi-unit device 600 also have an onboard storage device 154 and a control device 156. The storage device may be used to store performance data from the mobile devices 118a-d, configuration files for the mobile devices 118a-d, turn-by-turn instruction data for the GPS 144, and any other like information.

Storage device 154 comprises any combination of volatile and non-volatile computer-readable media for reading and writing. Volatile computer-readable media includes, for example, random access memory (RAM). Non-volatile computer-readable media includes, for example, read only memory (ROM), magnetic media such as a hard-disk, an optical disk drive, a floppy diskette, a flash memory device, a CD-ROM, and/or the like.

The optional control device 156 may be another mobile device 118a-d, a laptop computer, or any other type of computing device useful for controlling the operations of the multi-unit device 600. In some cases, the control device 156 has a wireless transceiver used to wirelessly communicate data and/or instructions between the multi-unit device 600 and an external computer. If the storage device 154 and/or control device 156 are included in the multi-unit device 600, then each also receives power via the power input 148 and internal interface 152.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for collecting performance quality data, comprising:
    operating a mobile device in cooperation with a particular wireless network, the mobile device operable to access contracted wireless network services via the particular wireless network;
    loading a software program onto the mobile device;
    receiving a set of configuration data;
    detecting whether or not a global positioning system is already in operation;
    if the global positioning system is already in operation, then receiving latitude and longitude coordinates from the global positioning system, and collecting a plurality of performance characteristics of the mobile device according to the configuration data if the latitude and longitude coordinates fall within a particular geographic area, the performance characteristics representative of wireless network quality;
    if the global positioning system is not in operation, then identifying a group of cell towers within the particular wireless network, determining which cell tower the mobile device is currently associated with, and collecting the plurality of performance characteristics if the cell tower the mobile device is currently associated with is one of a group of cell towers received as part of the set of configuration data; and
    wirelessly communicating at least some of the plurality of performance characteristics from the mobile device.

2. The method of claim 1 wherein the collecting is performed without significant adverse effects to the performance of the mobile device.

3. The method of claim 1 wherein the wireless network services are contracted by an individual user.

4. The method of claim 1, further comprising:
    retrieving a current time value;
    collecting the plurality of performance characteristics if the retrieved time value is within a particular time window.

5. The method of claim 1 wherein the plurality of performance characteristics includes network signal strength, data transfer speed, and a measurement of dropped calls.

6. The method of claim 1, further comprising:
determining if the mobile device is receiving power from an external source; and
collecting additional performance characteristics if the mobile device is receiving power from an external source.

7. The method of claim 1, further comprising:
determining if the mobile device is coupled to a wired network resource; and
communicating the at least some of the plurality of performance characteristics from the mobile device via the wired network resource.

8. A non-transitory computer readable medium comprising content that configures a mobile device to perform the steps of claim 1.

9. A mobile computing device, comprising:
a central processing unit (CPU);
a wireless transceiver; and
a memory storing software, the software executable by the CPU and operable to:
wirelessly receive command information from a first server via the wireless transceiver;
detect whether or not a global positioning system is already in operation;
if the global positioning system is already in operation, then receive latitude and longitude coordinates from the global positioning system, and collect performance measurement data as directed by the command information if the latitude and longitude coordinates fall within a particular geographic area, the performance measurement data representative of the mobile computing device performance within a wireless network;
if the global positioning system is not already in operation, then identify a group of cell towers within the particular wireless network, determine which cell tower the mobile device is currently associated with, and collect the plurality of performance characteristics if the cell tower the mobile device is currently associated with is one of a group of cell towers received as part of the command information; and
communicate at least some of the performance measurement data back to a second server via the wireless transceiver.

10. The mobile computing device of claim 9 wherein the first server and the second server are physically separate computing devices.

11. The mobile computing device of claim 9, further comprising:
a display, wherein the software executable by the CPU presents a user interface on the display; and
an input configured to receive parameters for controlling the software executable by the CPU.

12. The mobile computing device of claim 9 wherein the software executable by the CPU operates as a background application, transparent to an operator of the mobile device.

13. A system for collecting wireless network performance data, the system comprising:
a mobile device provisioned for typical operation on a wireless communication network by a contracted subscriber;
a memory associated with the mobile device, the memory configured to store a software application, the software application configured to:
receive direction from a first server;
detect whether or not a global positioning system is already in operation;
if the global positioning system is already in operation, then receive latitude and longitude coordinates from the global positioning system and collect the wireless network performance data according to the direction; if the latitude and longitude coordinates fall within a particular geographic area
if the global positioning system is not already in operation, then identify a group of cell towers within the particular wireless network, determine which cell tower the mobile device is currently associated with, and collect the plurality of performance characteristics if the cell tower the mobile device is currently associated with is one of a group of cell towers received as part of the direction; and
communicate at least some of the wireless network performance data back to a second server.

14. The system for collecting wireless network performance data of claim 13 wherein the software application is further configured to collect the wireless network performance data without significant adverse effects to the typical operation of the mobile device.

15. The system for collecting wireless network performance data of claim 13 wherein the software application is further configured to receive direction as a configuration file, the configuration file received as a payload of a single message packet from the first server.

* * * * *

UNITED STATES PATENT AND TRADEMARK OFFICE
CERTIFICATE OF CORRECTION

PATENT NO.        : 8,160,571 B2  
APPLICATION NO.   : 12/574593  
DATED             : April 17, 2012  
INVENTOR(S)       : Paul Griff et al.

Page 1 of 1

It is certified that error appears in the above-identified patent and that said Letters Patent is hereby corrected as shown below:

IN THE CLAIMS:

Column 22, In claim 13, Line 26:
"geographic area" should read, --geographic area;--.

Signed and Sealed this
Fourth Day of December, 2012

David J. Kappos
*Director of the United States Patent and Trademark Office*